(12) United States Patent
Ford et al.

(10) Patent No.: US 11,959,037 B2
(45) Date of Patent: Apr. 16, 2024

(54) SYSTEM AND PROCESSES FOR UPGRADING SYNTHETIC GAS PRODUCED FROM WASTE MATERIALS, MUNICIPAL SOLID WASTE OR BIOMASS

(71) Applicant: IQ ENERGY INC., St Albert (CA)

(72) Inventors: Darrell Ford, Spruce Grove (CA); Ken Davison, Lake Country (CA)

(*) Notice: Subject to any disclaimer, the term of this patent is extended or adjusted under 35 U.S.C. 154(b) by 357 days.

(21) Appl. No.: 17/426,595

(22) PCT Filed: Jan. 28, 2020

(86) PCT No.: PCT/CA2020/050099
§ 371 (c)(1),
(2) Date: Jul. 28, 2021

(87) PCT Pub. No.: WO2020/154801
PCT Pub. Date: Aug. 6, 2020

(65) Prior Publication Data
US 2022/0089961 A1    Mar. 24, 2022

Related U.S. Application Data

(60) Provisional application No. 62/797,897, filed on Jan. 28, 2019.

(51) Int. Cl.
*C10L 3/08* (2006.01)
*C10G 11/22* (2006.01)

(52) U.S. Cl.
CPC .............. *C10L 3/08* (2013.01); *C10G 11/22* (2013.01); *C10G 2300/1003* (2013.01); *C10G 2300/1011* (2013.01)

(58) Field of Classification Search
CPC ... C10L 3/08; C10G 11/22; C10G 2300/1003; C10G 2300/1011
See application file for complete search history.

(56) References Cited

U.S. PATENT DOCUMENTS

| | | | |
|---|---|---|---|
| 7,214,252 B1 | 5/2007 | Krumm et al. | |
| 10,377,953 B2 * | 8/2019 | Gong | ..................... C10B 53/02 |

(Continued)

FOREIGN PATENT DOCUMENTS

DE     100 47 787 A1    3/2002

*Primary Examiner* — Youngsul Jeong

(57) ABSTRACT

A system and process for producing synthetic gas from solid fuel comprising waste material, municipal solid waste or biomass, and for upgrading the synthetic gas produced. The system and process utilizes a first thermal chamber having a gasification zone in which a fuel stream is gasified by thermal oxidation to produce a first synthetic gas stream and heat; a pyrolysis reactor housed within the first thermal chamber where fuel undergoes pyrolysis to produce a second synthetic gas stream; and a thermal catalytic reactor comprising a second thermal chamber having a catalyst chamber within with a selected catalyst. The first synthetic gas stream is completely thermally oxidized to produce high temperature flue gas that imparts heat to the catalyst chamber in which the second synthetic gas stream is thermally cracked and directed over the catalyst to yield a finished gas or liquid product having a desired chemical composition as determined by the selected catalyst.

28 Claims, 10 Drawing Sheets

(56) References Cited

U.S. PATENT DOCUMENTS

| | | | | |
|---|---|---|---|---|
| 2009/0265987 A1* | 10/2009 | Xu | ............................. | C10J 3/66 |
| | | | | 48/89 |
| 2012/0117860 A1* | 5/2012 | Brady | ..................... | C10B 49/22 |
| | | | | 44/307 |
| 2015/0129806 A1 | 5/2015 | Filippi et al. | | |
| 2016/0272904 A1* | 9/2016 | Cheiky | .................... | C10G 1/10 |

* cited by examiner

SYSTEM AND PROCESSES FOR UPGRADING SYNTHETIC GAS PRODUCED FROM WASTE MATERIALS, MUNICIPAL SOLID WASTE OR BIOMASS

FIELD OF THE INVENTION

The present invention relates to thermal gasification, thermal oxidation and pyrolysis of various waste materials such as waste plastics, municipal solid waste, sewage sludge or other organic materials.

SUMMARY OF THE INVENTION

In particular, the present invention provides a system for upgrading synthetic gas to a desired liquid or gaseous product from waste materials, municipal solid waste or biomass. The invention provides systems and processes for gasification, thermal oxidation and pyrolysis of waste materials, such as waste plastics, municipal solid waste (MSVV), sewage sludge or other organic materials, in order to produce a useable clean rich gas or a liquid when at room temperatures with all solid contaminates such as ash, bio-char, metal, glass, silica, and other non-organic or inert materials removed. The process also effectively removes any fixed carbon or particulate that is formed during the thermal gasification, thermal oxidation and pyrolysis processes.

The system can effectively process waste materials into a high value rich gas stream, meaning that it is non-diluted and absent of diluting contaminants such as nitrogen from the air used as an oxidant, CO2 and other products of thermal oxidation, or a custom long-chain hydrocarbon liquid, and a valuable high temperature flue gas stream away from a waste solids stream, which may be made up of ash, bio-char, fixed carbon, metals, glass and other inert materials. Once the inert materials are removed, the clean and inert-free rich gas stream can be further refined into high value gaseous, or liquid products without risk of contamination by the solids and inert materials which can also damage downstream equipment, such as heat exchangers, pumps, compressors and catalysts beds used in thermal or catalytic cracking or reforming processes.

In one aspect the present invention provides a system for producing synthetic gas from solid fuel comprising waste material, municipal solid waste or biomass, and for upgrading the synthetic gas produced, the system comprising: a first thermal chamber having a gasification zone in which an incoming first fuel stream is gasified by thermal oxidation to produce a first synthetic gas stream and heat; a first fuel feed system that delivers the first fuel stream into the gasification zone in an oxygen starved manner resulting in an oxygen starved delivery of the first fuel stream into the first thermal chamber; a pyrolysis reactor housed within the first thermal chamber; a second fuel feed system that delivers a second fuel stream into the pyrolysis reactor in a manner that prevents oxygen from entering the pyrolysis reactor, wherein the heat produced in the gasification zone is imparted to the second fuel stream in the pyrolysis reactor to cause pyrolysis of the second fuel stream and produce a second synthetic gas stream; and a thermal catalytic reactor comprising a second thermal chamber and a catalyst chamber defined by a housing located within the second thermal chamber, the catalyst chamber having a selected catalyst therein, the second thermal chamber being operable to receive the first synthetic gas stream and completely thermally oxidize the first synthetic gas stream to produce high temperature flue gas that imparts heat to the housing of the catalyst chamber, and the catalyst chamber being operable to receive the second synthetic gas stream and to thermally crack the second synthetic gas stream to produce a cracked synthetic gas stream, and then to direct the cracked synthetic gas stream to the catalyst to yield a finished gas or liquid product having a desired chemical composition as determined by the selected catalyst in the catalyst chamber.

In some embodiments, the thermal catalytic reactor may be separate from the first thermal chamber, and the system may further comprise a first gas conduit from the gasification zone to the second thermal chamber and a second gas conduit from the pyrolysis reactor to the catalyst chamber.

In some embodiments, the second thermal chamber may include a flue gas outlet, and a blower downstream of the flue gas outlet that produces a negative pressure upstream of itself to draw the first synthetic gas stream out of the first thermal chamber, through the first gas conduit, and into the second thermal chamber, and the high temperature flue gas past the catalytic reactor.

In some embodiments, the first thermal chamber may have a fuel inlet end and an ash outlet end, and a conveyor to move the first fuel stream from the fuel inlet end towards the ash outlet end such that much of the first synthetic gas stream is produced towards the ash outlet end.

In some embodiments, the pyrolysis reactor may be adjacent the ash outlet end.

In some embodiments, the first gas conduit may exit the first thermal chamber adjacent the fuel inlet end to promote a flow of the first synthetic gas stream that is counter to a direction of the movement of the first fuel stream in the first thermal chamber.

In some embodiments, the system may further comprise an ash extraction mechanism that removes ash and residue from the first thermal chamber via the ash outlet.

In some embodiments, the system may further comprise a flue gas conduit to convey the flue gas from the thermal catalytic reactor to a system for utilizing a portion of remaining heat in the flue gas for useful heating applications.

In some embodiments, the system may further comprise a heating surface in the pyrolysis reactor and wherein the second fuel feed system is operable to convey the second fuel stream onto the heating surface, wherein the heating surface is heated as a result of the thermal oxidation taking place in the gasification zone to a temperature sufficient to commence pyrolysis of the second fuel stream upon contact with the heating surface.

In some embodiments, the heating surface may comprise a plate member sloped downwardly from a fuel receiving end and being in thermal communication with the gasification zone of the first thermal chamber to receive heat produced from the thermal oxidation of the first fuel stream.

In some embodiments, the plate member may be hinged at its fuel receiving end such that the plate member may be moved into a vertical orientation for clearing of any built up ash and residue from the heating surface.

In some embodiments, the system may further comprise an actuator to move the plate member between a sloped orientation and vertical orientation.

In another aspect the present invention provides, a process for producing synthetic gas from solid fuel comprising waste material, municipal solid waste or biomass, and for upgrading the synthetic gas produced, the process comprising the steps of: providing a first thermal chamber having a gasification zone and feeding a first fuel stream into the gasification zone; gasifying the first fuel stream by thermal oxidation in the gasification zone to produce a first synthetic gas stream and heat; providing a pyrolysis reactor housed within the first thermal chamber; feeding a second fuel feed system into the pyrolysis reactor in a manner that prevents oxygen from entering the pyrolysis reactor, and pyrolyzing the second fuel stream using the heat produced in the gasification zone to produce a second synthetic gas stream; and providing a thermal catalytic reactor comprising a second thermal chamber and a catalyst chamber defined by a housing located within the second thermal chamber, the catalyst chamber having a selected catalyst therein; flowing the first synthetic gas stream into the second thermal chamber and completely thermally oxidizing the first synthetic gas stream to produce high temperature flue gas that imparts heat to the housing of the catalyst chamber; flowing the second synthetic gas stream through the catalyst chamber and thermally cracking the second synthetic gas stream to produce a cracked synthetic gas stream; and flowing the cracked synthetic gas stream through the catalyst to yield a finished gas or liquid product having a desired chemical composition as determined by the selected catalyst in the catalyst chamber.

In some embodiments, the thermal catalytic reactor may be provided separate from the first thermal chamber, and further providing a first gas conduit from the gasification zone to the second thermal chamber, and a second gas conduit from the pyrolysis reactor to the catalyst chamber.

In some embodiments, the second thermal chamber may include a flue gas outlet, and further comprising a step of producing a negative pressure upstream of the flue gas outlet to draw the first synthetic gas stream out of the first thermal chamber, through the first gas conduit, and into the second thermal chamber, and the high temperature flue gas past the catalytic reactor.

In some embodiments, the first thermal chamber may have a fuel inlet end and an ash outlet end, and further comprising a step of conveying the first fuel stream from the fuel inlet end towards the ash outlet end such that much of the first synthetic gas stream is produced towards the ash outlet end.

In some embodiments, the pyrolysis reactor may be provided adjacent the ash outlet end.

In some embodiments, the process may further comprise a step of flowing the first synthetic gas stream counter to a direction of the movement of the first fuel stream in the first thermal chamber.

In some embodiments, the process may further comprise a step of removing ash and residue from the first thermal chamber via the ash outlet.

In some embodiments, the process may further comprise a step of utilizing the flue gas exiting from the thermal catalytic reactor for useful heating applications.

In some embodiments, the process may further comprise a step of providing a heating surface in the pyrolysis reactor and conveying the second fuel stream onto the heating surface, wherein the heating surface is heated as a result of the thermal oxidation taking place in the gasification zone to a temperature sufficient to commence pyrolysis of the second fuel stream upon contact with the heating surface.

In some embodiments of the present invention, the system comprises of a first thermal chamber such as primary gasification chamber; a fuel feed system capable of delivering material into the primary gasification chamber in an oxygen deprived manner; an ash removal system capable of removing ash from the primary gasification chamber while restricting the inlet of tramp oxygen into the system; a pyrolysis reactor such as pyrolysis apparatus housed within the primary gasification chamber; a fuel feed system capable of delivering material into the pyrolysis apparatus in an oxygen starved condition; a secondary thermal chamber in communication with the primary gasification chamber; a heat exchanger housed within the secondary thermal chamber; and a catalyst chamber housed within the secondary thermal chamber.

In some embodiments, the pyrolysis apparatus comprises a contiguous chamber having at least one conduit in communication with the heat exchanger housed within the secondary chamber and the catalyst chamber housed within the secondary chamber but not in communication with the primary gasification chamber or the secondary thermal chamber; a feeding system capable of delivering materials into the contiguous chamber of the pyrolysis apparatus only in an oxygen starved condition and not into the primary gasification chamber; at least one wall of the chamber forming a hot surface onto which the feeding system delivers waste materials in an oxygen starved condition and which hot surface has an outer face in communication with the primary gasification chamber through which thermal energy flows via conduction; the hot surfaces formed in the apparatus are placed at an angle; an appropriately sized opening in the lower portion of the pyrolysis apparatus contiguous chamber for solid materials to exit from below the hot surface(s).

The pyrolysis apparatus is preferable configured in such a way as to allow for material being processed to enter the pyrolysis apparatus in an oxygen starved condition and upon entering the pyrolysis apparatus to come into contact with one or more of the outer boundary walls of the pyrolysis reactor and with the hot gasses present within the pyrolysis apparatus contiguous chamber which together act as heat transfer mechanisms within the hot surfaces of an appropriate geometry (could be flat plate, ribbed, mesh, tubes, rods) and placed at angle/slopes suitable to cause the solids from the reacting materials to travel downward and toward the bottom of the hot surface, effectively controlling the residence time or duration of the contact between the hot gasses and hot surfaces and the solids and gasses of the reacting material allowing for the reacting materials to effectively absorb thermal energy from the hot surfaces and hot gasses adequate to cause a complete phase change in the reacting materials, in the absence of oxygen or other gaseous contaminants or products of thermal oxidation or combustion such as CO or $CO_2$ for example. This phase change effects a separation of the feed-stock materials into a rich gas, for further processing, and a solids mixture consisting of materials such as ash, bio-char, fixed carbon, inert materials, glass and metals. The solid contaminates flow downward and out of the pyrolysis apparatus and into the primary gasification chamber and are then removed from the system via the ash system attached to primary gasification chamber.

DETAILED DESCRIPTION

Figure 1:
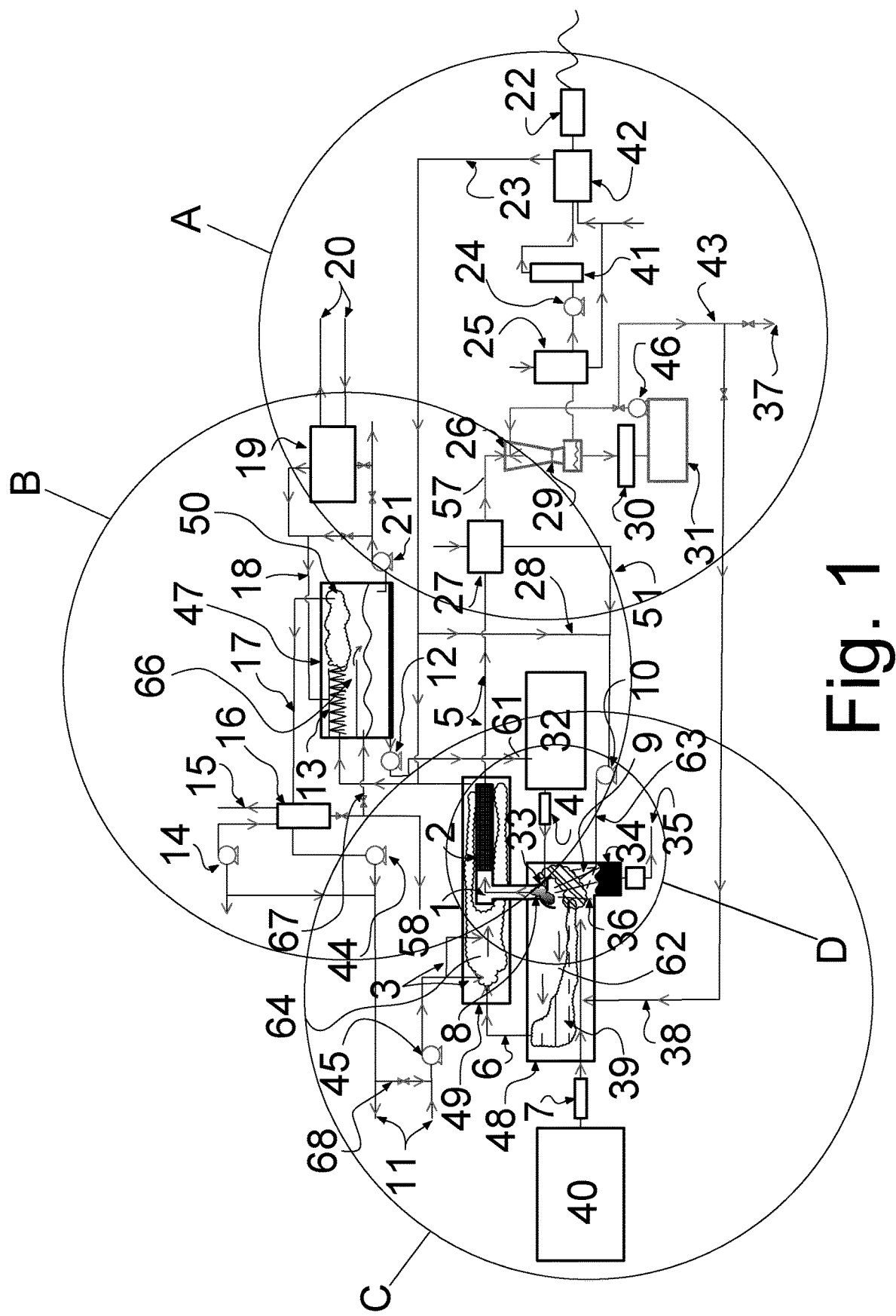
FIG. 1 is an overview process diagram of a preferred embodiment of the overall system.
Figure 2:
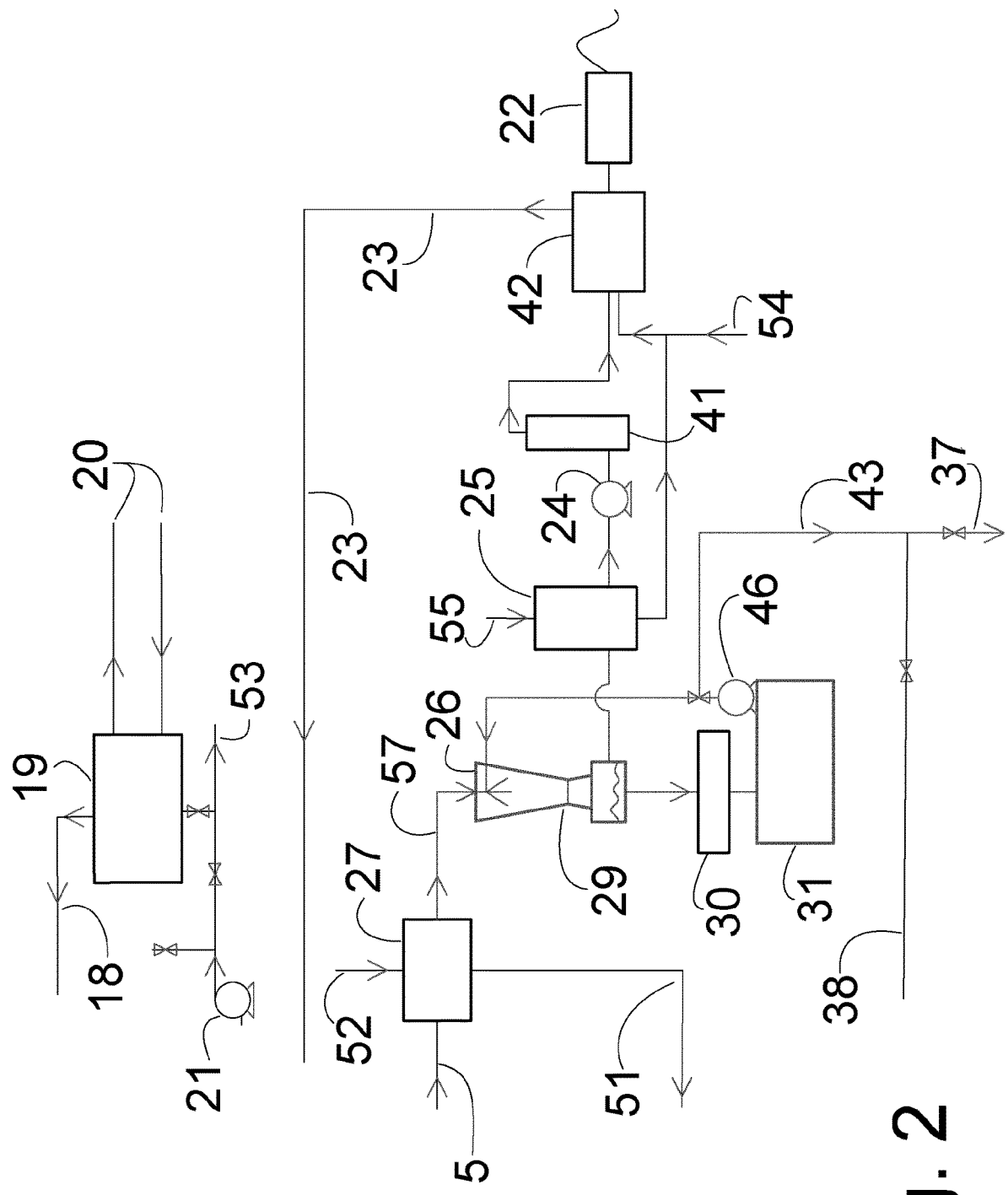
FIG. 2 is a detailed view of area A of FIG. 1 showing the pyrolysis oil quench system and liquid/gas separation systems, the fuel gas clean-up system, the power generation system with heat recovery components.
Figure 3:
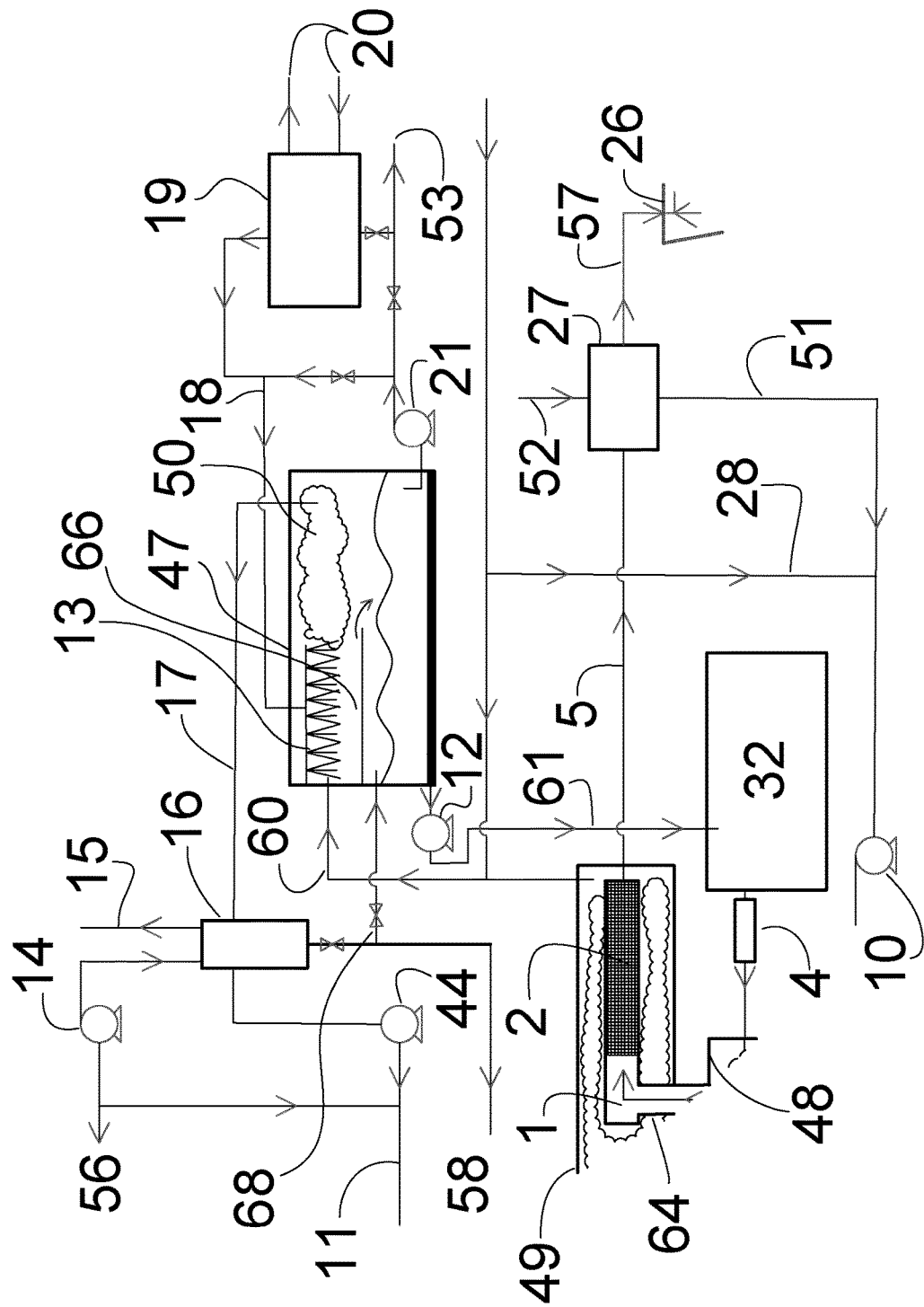
FIG. 3 is a detailed view of area B of FIG. 1 showing the liquid quench system, the heat recovery system, the fuel-gas heat recovery system.
Figure 4:
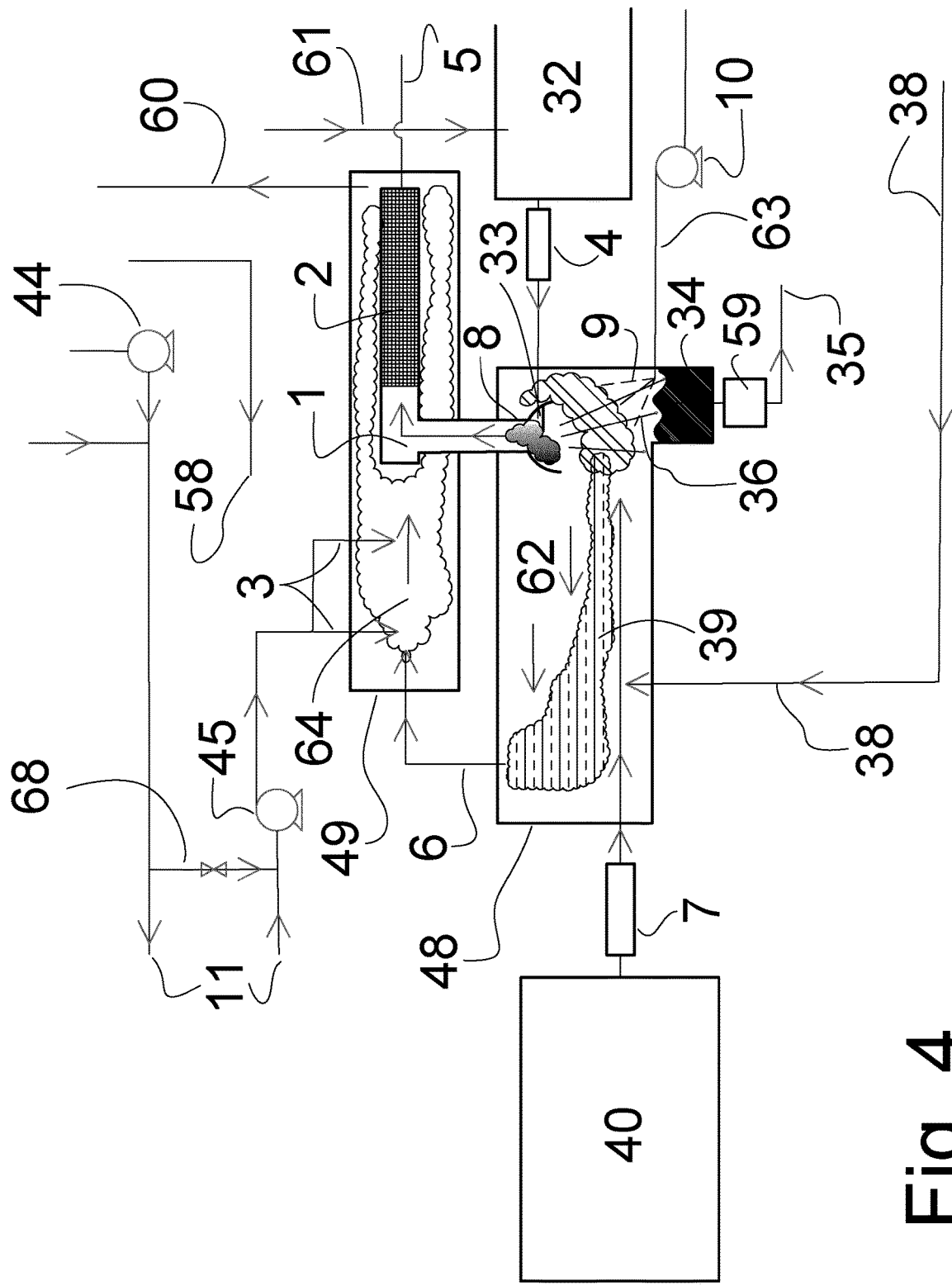
FIG. 4 is a detailed view of area C of FIG. 1 showing the front end of the process including primary reaction area 9, the thermal oxidizer 49, the primary gasification reactor 48, the pyrolysis reactor 33, the thermal and catalytic cracking apparatus 1 and 2.
Figure 5:
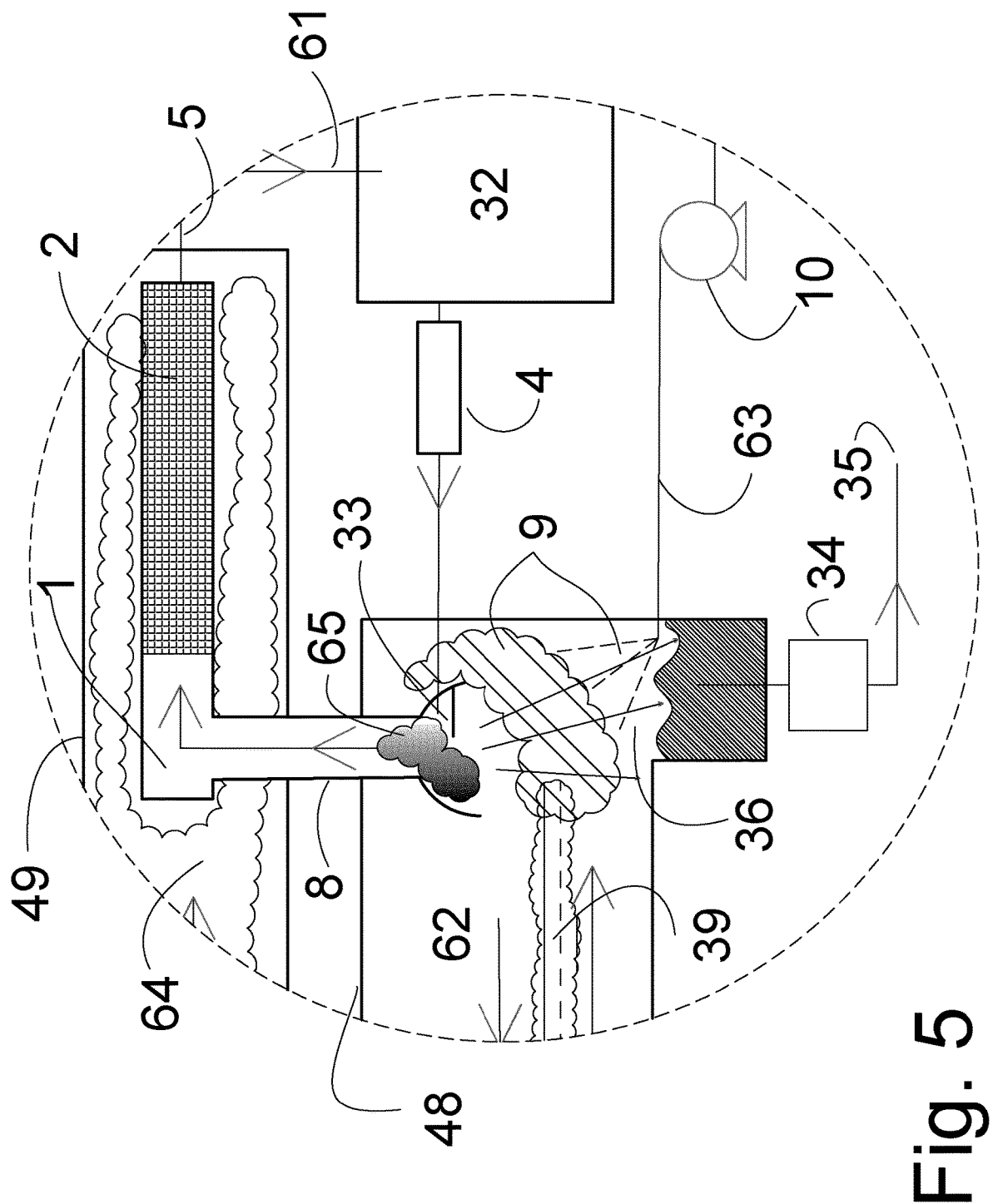
FIG. 5 is a detailed view of area D of FIG. 1 showing the primary gasification reaction area 9, the pyrolysis reactor 33, the thermal and catalytic cracking or reforming apparatus 1 and 2.

Referring to the FIGS. 1-5, biomass, municipal solid waste (MSW) or other suitable waste materials, referred to herein as simply "fuel", are delivered into hoppers 40 and 32 as received, or alternatively after being prepared by various methods such as size reduction, sort to provide more homogeneous fuel streams, or a pre-clean to separate certain undesirable materials such as metals, glass and various plastics for recycle before fuel is introduced to the primary gasification reactor and pyrolysis reactor.

A first fuel stream enters the process and into a first thermal chamber such as primary gasification reactor 48 in an oxygen deprived condition via fuel hoppers 40 and first fuel feed system such as feeders 7, and a second fuel stream enters into a pyrolysis apparatus such as pyrolysis reactor 33 in an oxygen starved condition via fuel hopper 32 and through second fuel feed system such as feeders 4. Various known or commercially available systems can be utilized for feeders 7 and 4, including but not limited to ram/plunger mechanisms, augers, shaftless augers, extrusion screws, air-locks or combinations of these and other systems capable of delivering a desired amount of fuel to the primary gasification reactor 48 and to the pyrolysis reactor 33 while eliminating or reducing oxygen content in the form of air. Feed systems 7 and 4 are configured to restrict or eliminate the flow of oxygen into the reactors 48 and 33 while at the same time deliver the desired volume of fuel required by the process as controlled by the system PLC and operator-controlled set-points.

First fuel stream is delivered from hopper 40 via infeed system 7 into primary gasification reactor 48. First fuel stream is moved progressively from entry point, or fuel inlet end, of the feed system 7 to a gasification zone of primary gasification reactor 48 and to the ash removal end and ash extraction system 36 via a suitable conveyance system, which could be a moving floor system, series of augers, shuffle floor system or any other conveyance method capable of moving first fuel stream horizontally from the inlet of gasification reactor 7 to the exit of gasification reactor 48 at the ash extraction point 36. As first fuel stream travels horizontally and counter flow to the path of the dilute syn-gas, moving from infeed system 7 toward exit point 36 in the primary gasification reactor 48, the first fuel stream material absorbs thermal energy by direct contact, conduction and convection from the counterflowing hot partially oxidized dilute syn-gasses 39 being produced by a thermal oxidation reaction taking place in the primary gasification zone 9, where the thermal oxidation reaction takes place between the first fuel stream and air being injected via fan 10 and is controlled to maintain a partial thermal oxidation reaction temperature in the range of 800° F. to 1800° F. in the primary gasification zone 9. A first synthetic gas stream such as high temperature partially oxidized dilute syn-gasses 39 are produced in the primary gasification reactor 48 and the high temperature dilute syn-gasses 39 are caused to travel counterflow, above the incoming first fuel stream and moving toward a first gas conduit such as conduit 6, due to the negative pressure maintained on the system via a downstream ID fan 44, Dilute syn-gasses travel in a counter flow direction and above the incoming fuel to the primary gasification reactor.

The high temperature dilute syn-gasses 39 travel via conduit 6 into a thermal catalytic reactor having a second thermal chambers such as thermal oxidizer 49 where they are blended with incoming air traveling via conduit 11 and delivered by fan 45 to conduits 3 and then into thermal oxidizer 49. Dilute syn-gasses and air are reacted in the thermal oxidizer 49 at a temperature range from 1200° F. to 2500° F. controlled by the onboard programmable logic controller (PLC) system or the like that is configured to control the air/dilute syn-gas mixture ratio in order to sustain a complete thermal oxidation of the dilute syn-gasses and air mixture into high temperature fully reacted flue gasses (FG) in the thermal oxidizer 49. The high temperature fully reacted flue gasses (FG) move through the thermal oxidizer 49 traveling away from inlet conduit 6 toward a flue gas conduit such as exit conduit 60.

In one preferred embodiment the flue gasses travel via conduit 60 to quench/scrubber chamber 47 and upon entering chamber 47 pass through a conduit 66 having a series of liquid spray heads 13. As the flue gasses flow through conduit 66 they come into direct contact with the liquids flowing from multiple spray heads 13 and effectively transfer heat energy into the liquid flowing from spray heads 13. Liquid flowing through spray heads 13 is delivered from the reservoir in the lower part of chamber 47 via liquid pump 21. Hot liquids flow from chamber 47 via pump 21 to heat exchanger 19 where the liquids transfer thermal energy to the incoming fluids (liquids or gasses) traveling in and out of heat exchanger 19 at inlet/outlet 20. The fluids traveling in and out of heat exchanger 19 function as a heat extraction method to deliver thermal energy produced by the process and present in the high temperature flue gasses, to desired applications such as space heating of buildings or thermal energy for use in dryers etc. Upon exiting heat exchanger 19, the now cooled liquid flows via conduit 18 to the spray heads 13 and then into reservoir at the bottom of chamber 47. As the incoming high temperature flue gasses pass across the liquid spray coming from multiple spray heads 13, the flue gasses transfer thermal energy into the circulated liquid, effectively raising the temperature of the circulated liquid to approximately 80° F. to 212° F. The circulated liquid then flows downward to be contained in the reservoir at the bottom of chamber 47. A controlled amount of saturated or super-heated vapor 50 may be produced in chamber 47 and conduit 66 from the direct contact of the fluid spray and the high temperature flue gasses.

The now cooled mixture of flue gasses and saturated or super-heated vapor exit chamber 47 via conduit 17 traveling to condenser 16, drawn by the negative pressure maintained on the system by Induced Draft (ID) fan 44. The vapor and flue gasses are cooled in condenser 16 resulting in the phase change of the vapors to liquid form allowing for the separation of the condensed liquids from the cooled flue gasses. The condensed liquids exit the condenser 16 via conduit 58 or alternatively return to chamber 47 via conduit 67. The cooled flue gasses exit condenser 16 and travel through ID fan 44 to exit at 11. Alternatively, the cooled flue gasses may travel via conduit 68 to be drawn into the process air stream via fan 45 and travel to the thermal oxidizer 49 via air headers 3 to be re-used as an oxidizing agent or a diluent to control temperatures of the thermal oxidation reaction.

The function of ID fan 44 is to maintain the desired negative pressure on chamber 47, thermal oxidizer 49 and primary gasification chamber 48. Negative pressure is controlled by an onboard PLC which receives pressure information from sensors on both the primary gasification chamber and thermal oxidizer and based on the input from these sensors the PLC increases or decreases the speed of the ID fan 44 as needed to maintain the desired negative pressure based on an operator setpoint.

A second fuel stream is conveyed into the pyrolysis reactor 33 using methods resulting in the second fuel stream entering the pyrolysis reactor 33 in an oxygen starved condition through second fuel feed system such as infeed system 4 from fuel storage hopper 32. Upon entering the pyrolysis reactor 33 the second fuel stream rapidly absorbs thermal energy by conduction and convection from the gasses and radiant heat conditions present inside the primary gasification reactor zone 9 producing a rapid increase in temperature of the second fuel stream resulting in pyrolysis of the second fuel stream into primarily two components—a second synthetic gas stream such as a mixture of high temperature rich synthetic gasses (RG) which have been partially 'cracked' into shorter molecular chains 65; and a volume of solid materials made up of various solid materials such as ash, biochar, fixed carbon and non-organic residue. The non-organic residue is made up of materials that do not phase change or volatize at the pyrolysis reactor temperatures. Materials such as ash, biochar, metals, glass, silica could be ingredients of the residue mixture. The partially cracked RG mixture 65, travels out of the pyrolysis reactor 33 via conduit 8 and into a secondary thermal chamber such as the high temperature thermal/catalytic reactor 1 and through a catalyst chamber such as the catalyst bed 2. The non-organic residue and fixed carbon materials produced in pyrolysis reactor 33 during the pyrolysis of the second fuel stream move/fall downward into the primary gasification reactor 48, conveyed by gravity and thereby moving out of the pyrolysis reactor 33, into the primary gasification reactor 48 and are then collected in the ash reservoir 34 and finally removed from the primary gasification reactor 48 via a conveyance system and then through airlock 59 and conduit 35. The RG gasses 65 are effectively drawn out of the pyrolysis reactor 33 and through the thermal catalytic reactor 1 by negative pressure maintained on the entire pyrolysis system by compressor 24. The negative pressure is controlled by a PLC receiving information from pressure instruments place in the pyrolysis reactor ducts as needed and the PLC adjusts the speed of the compressor drive motor on compressor 24 via a variable frequency drive to maintain the desired operator negative pressure set-point.

The RG gasses 65 produced in pyrolysis reactor 33 may follow one or both of two paths: 1) In response to the negative pressure maintained by compressor 24, the RG gasses may travel out of the pyrolysis reactor 33 via conduit 8 into the thermal/catalytic reactor 1 where the RG gasses remain separated from the high temperature flue gasses present in the thermal oxidizer 49; and/or 2) in response to competing negative pressures maintained in the primary gasification rector 48, by ID fan 44 the RG gasses may move away from the pyrolysis reactor 33 and into the primary gasification reactor 48 where the RG gasses may mix with the dilute syn-gasses present and being produced in the primary reaction area 9 and may undergo partial or complete thermal oxidation in the primary gasification reaction area 9, or, the RG gasses may mix with dilute syn-gas 39 resident in the primary gasification reactor 48 which are continuously moving counterflow and above the fuel bed to exit the primary gasification reactor 48 via conduit 6 and thereby moving into thermal oxidizer 49. Upon entering thermal/catalytic reactor 1 the partially cracked RG gasses undergo a further increase in temperature absorbing thermal energy indirectly by conduction of thermal energy through the walls of the thermal/catalytic reactor apparatus 1, from the high temperature flue gasses and radiant heat energy resident inside the thermal oxidizer 49. The high temperature complete oxidation reaction taking place in thermal oxidizer 49 is sustained by the oxidation of dilute syn-gas from the primary gasification reactor 48 combined with air being directed into thermal oxidizer 49 via conduits 3 and delivered by process air fan 45 resulting in the complete oxidation of the dilute syn-gasses into high temperature flue gas (FG) 39.

The RG gasses remain separate from the flue gasses resident in the thermal oxidizer 49 and absorbs thermal energy indirectly via conduction through the walls/surface area of the thermal/catalytic reactor 1. As the temperatures of the RD gasses increase further additional cracking/degradation of the molecules making up the RD gasses take place, further reducing the gasses into shorter carbon (C) chain molecular compounds. The RD gasses then pass through the catalyst bed resident in the catalytic reactor 2 resulting in a further reduction of the molecular structure of the RD gasses forming a synthetic fuel gas with carbon chains of <C4-C60 suitable as a fuel gas feed stock (FG) or alternatively the RD gasses pass through a selective catalyst bed resident in the catalytic reactor 2 resulting in a reforming of the hydrocarbon chains selectively based on the action of the catalyst employed which produces a targeted group of hydrocarbon chains that when cooled and condensed, form a liquid product such as Naptha (C6-C13) that could be suitable for use as a feedstock for new plastic production in the place of Natural Gas, as well as other desired hydrocarbon mixtures and carbon chain lengths useful for other purposes.

Upon exiting the thermal catalytic reactor 1 via conduit 5, the high temperature processed gas RG travels through to recuperator 27 where the high temperature processed gas, RG exchanges thermal energy with incoming air stream via indirect exchange in recuperator 27. Process air fan 10 pulls air through the recuperator 27 via inlet 52, through recuperator 27, through conduit 51 and through process air fan 10 which delivers the now pre-heated air to the primary gasification reaction area 9 via conduit 63 which can be used as a thermal oxidizing agent in the primary gasification chamber 9.

The cooled RG gasses then travels via conduit 57 to quench/scrubbing system 29 where they are further cooled and scrubbed in order to remove any condensable or soluble compounds present, which could be in the form of water, hydrocarbon liquids, waxes or solid contaminants. A suitable scrubbing medium (SM) may be any number of fluids such as water, oils/waxes/paraffins/hydrocarbons mixtures and/or a mixture of various condensable liquids as they are removed from the now Renewable Natural Gas (RNG) flow and collect in reservoir 31. The collected and cooled SM is stored in tank 31 and flows under appropriate pressure via pump 10 via conduit 69 to spray one or more spray heads 26. The SM comes into direct contact with the incoming RG and effectively cools the RG to <300° F. or to a desired temperature adequate to reduce the RG temperatures to a level where hydrocarbon chains greater than C5 experience phase change from vapor phase back to liquid phase at room temperatures allowing them to be absorbed by the circulating SM fluid flow and removed from the RG flow. The now heated and rich or loaded SM travels downward in quench/scrubbing chamber 29 traveling through cooler 30 and then into reservoir 31. Cooler 30 functions to cool the SM to a suitable temperature but maintaining the SM at a high enough temperature to stay in liquid form avoiding solids formation of any waxes or long chain hydrocarbons or tars etc. that may be present in the mixture, but cool enough to avoid any vaporization or phase change to vapor or boiling of the SM mixture. As liquids are absorbed from the RG flow the volumes of SM in reservoir 31 will increase. In order to maintain the level in reservoir 31, SM is removed from reservoir 31 via pump 46 and travels via conduit 43 to exit the system via conduit 37 for other use (i.e. in the case of Naphtha, as feedstock for new plastic production), or, alternatively the collected/excess SM can travel via conduit 38 to be injected into primary gasification reactor 48 for use as addition fuel for the primary gasification reaction effectively recirculating the liquids through the entire process.

The now cooled and cleaned processed gasses or Renewable Natural Gas (RNG) travels from quench/scrubber 29 to pre-cooler 25 and then through compressor 24 and into storage reservoir 41 where they are stored at a suitable pressure for further use. From reservoir 41 the pressurized RNG is delivered to a beneficial application such as a synthetic gas fueled engine 42 which could be either rotary, reciprocating or other, capable of driving various machines such as a generator 22 suitable for producing electricity. In a case where the RNG is used to fuel an engine/generator requiring combustion air, intake air preheat can be employed by drawing outside air in via conduit 55 and through pre-cooler 25 and into engine 42 and diluted by air coming via inlet 54 as needed to control air inlet temperatures to the engine in use.

Figure 6:
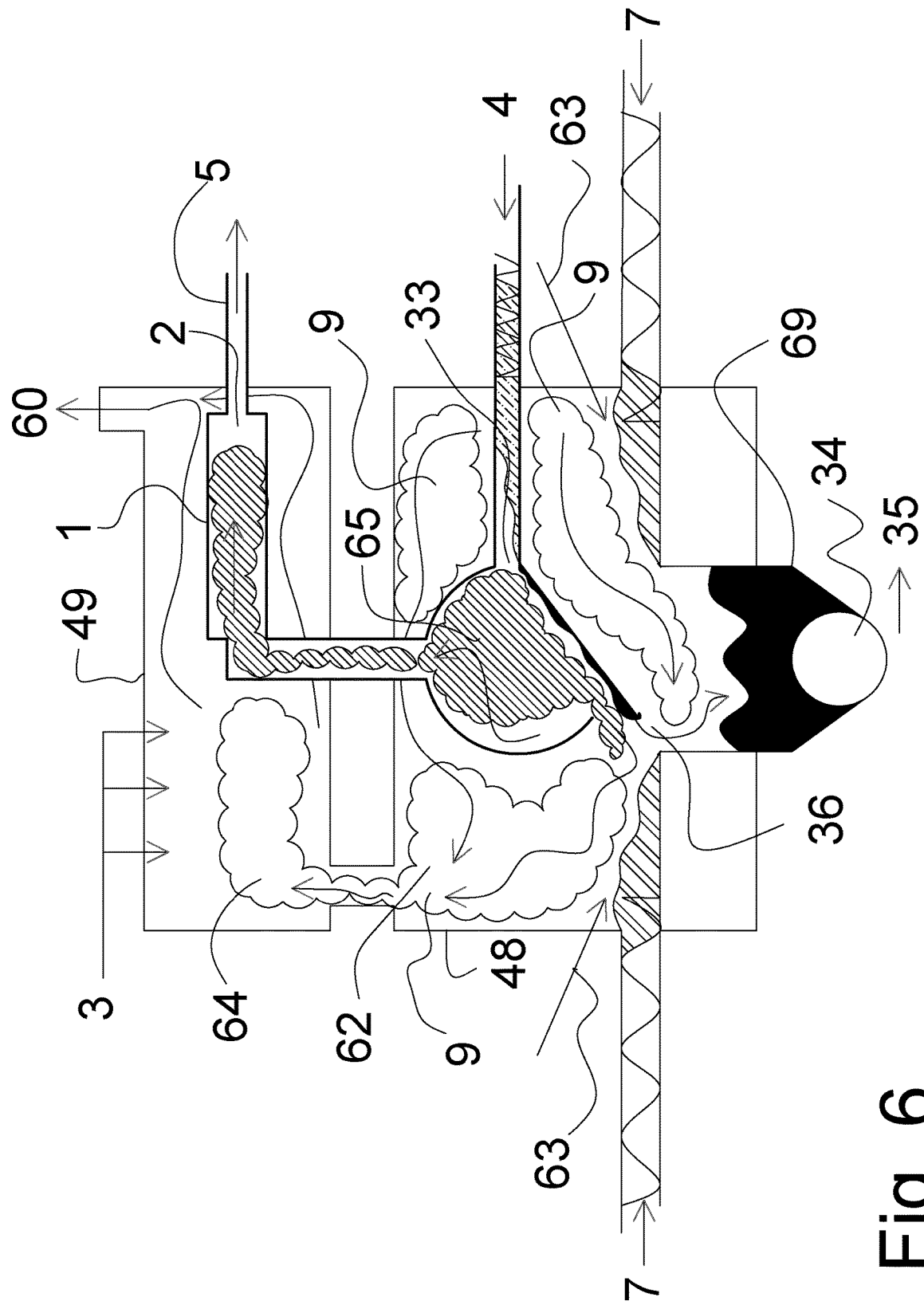
FIG. 6 is a detailed view of an alternate embodiment showing a third fuel infeed system allowing for two different fuels to be fed in an oxygen deprived condition into the primary gasification chamber and a single fuel blend being fed into the pyrolysis reactor in an oxygen starved condition. A second or third feeder could be configured to feed into the pyrolysis reactor to deliver fuel in an oxygen starved condition.

Referring to FIG. 6, there is shown a detailed view of an alternate embodiment showing a third fuel infeed system allowing for two different fuels to be fed into the primary chamber in an oxygen deprived condition and a single fuel blend being fed into the pyrolysis reactor under oxygen starved conditions. A second or third feeder could be configured to feed into the pyrolysis reactor under oxygen starved conditions.

Figure 7:
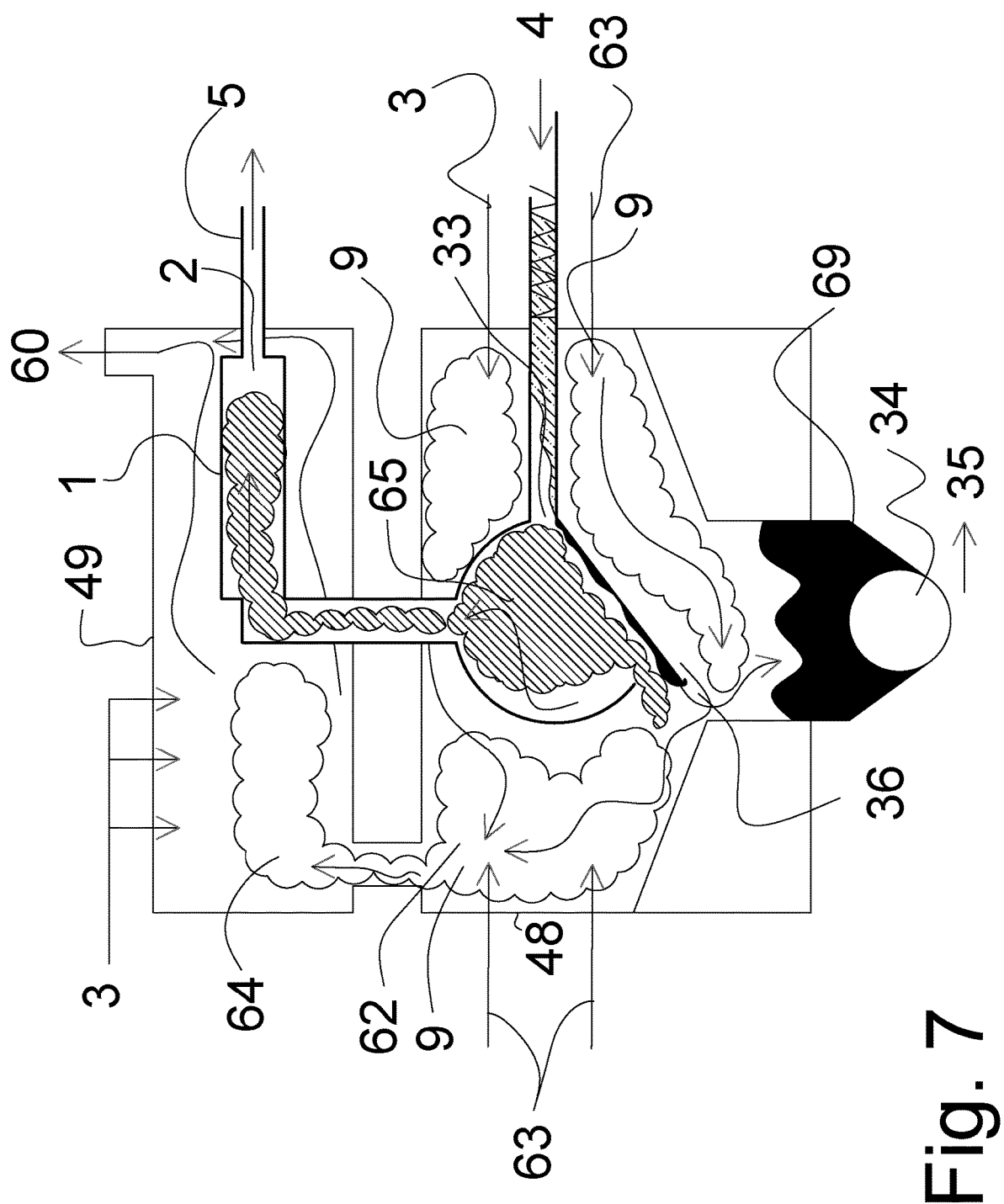
FIG. 7 is a detailed view an alternate embodiment where all three reactors are employed—Thermal Oxidizer, Primary Gasification Chamber, Pyrolysis Reactor. Also, this embodiment is being fueled by a single blended fuel coming into Pyrolysis Reactor 33 in an oxygen starved condition via infeed system 4.

Referring to FIG. 7, there is shown a detailed view an alternate embodiment showing a variation to FIG. 6 where all three reactors are employed—Thermal Oxidizer, Primary Gasification Chamber, Pyrolysis Reactor. Also, this embodiment is being fueled by a single blended fuel coming into Pyrolysis Reactor 33 under oxygen starved conditions via infeed system 4.

Figure 8:
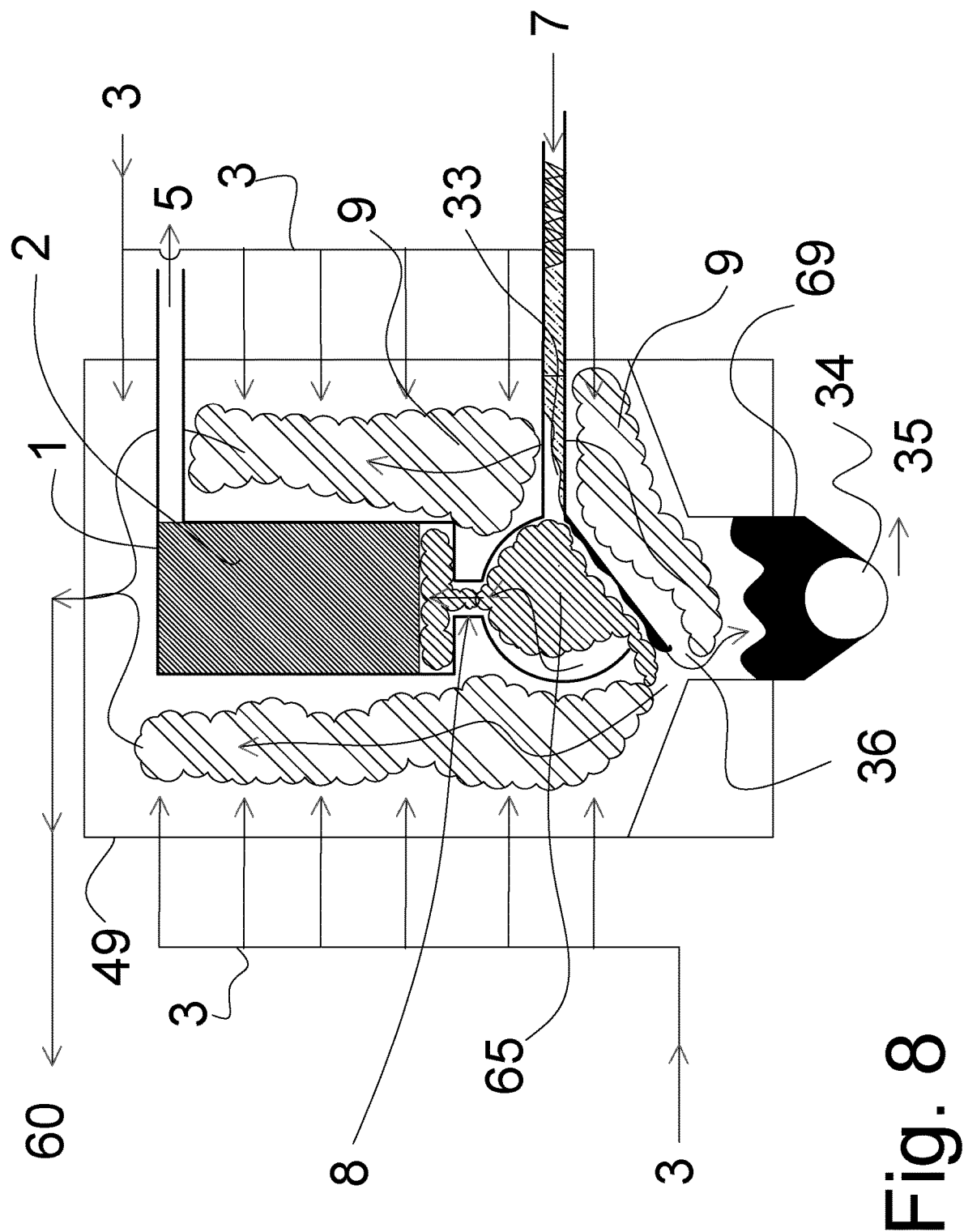
FIG. 8 is a detailed view of an alternate embodiment showing a variation from that in FIG. 7 where the thermal oxidizer and primary gasification reactor are combined into a single vertical configuration fed in an oxygen starved condition by a single blended fuel (SBF) to be processed in pyrolysis reactor 33.

Referring to FIG. 8, there is shown a detailed view of an alternate embodiment where the thermal oxidizer and primary reactor are combined into a single vertical configuration and are fed by a single blended fuel (SBF) to be processed in pyrolysis reactor 33. As in all embodiments, an adequate amount of fuel is fed into Pyrolysis reactor 33 via inlet 7 (or additional inlets) whereby an excess of rich syn-gas RG is produced within reactor 33 than is being drawn off and out via conduit 5. The slight imbalance in pressure between the primary reactor 49 and conduit 8 produces a flow preference for the RG to move out of reactor 33 and into primary reaction area 9 as opposed to dilute-syn-gas and partially reacted syn-gas traveling from primary reaction area 9 and into pyrolysis reactor 33, effectively providing a gaseous seal or separation between the two qualities and species of gasses. The deliberate 'leakage' from pyrolysis reactor 33 of RG into primary reaction area 9 effectively maintains a separation between the dilute syn-gasses and products of oxidation from the primary reactor 9 and the RG allowing only RG to travel via conduit 5 for further processing as either a Renewable Natural Gas/fuel gas or into a valuable liquid form suitable to be used for the manufacture of other products such as new plastics. In this embodiment the system would be operated in such a way as to feed the needed amount of fuel or SBF to produce an adequate amount of RG to both meet the thermal energy requirements in the primary gasifier 49 needed to maintain the desired temperature profile as well as to deliver an adequate or desired volume of RG to conduit 5 for further processing.

Figure 9:
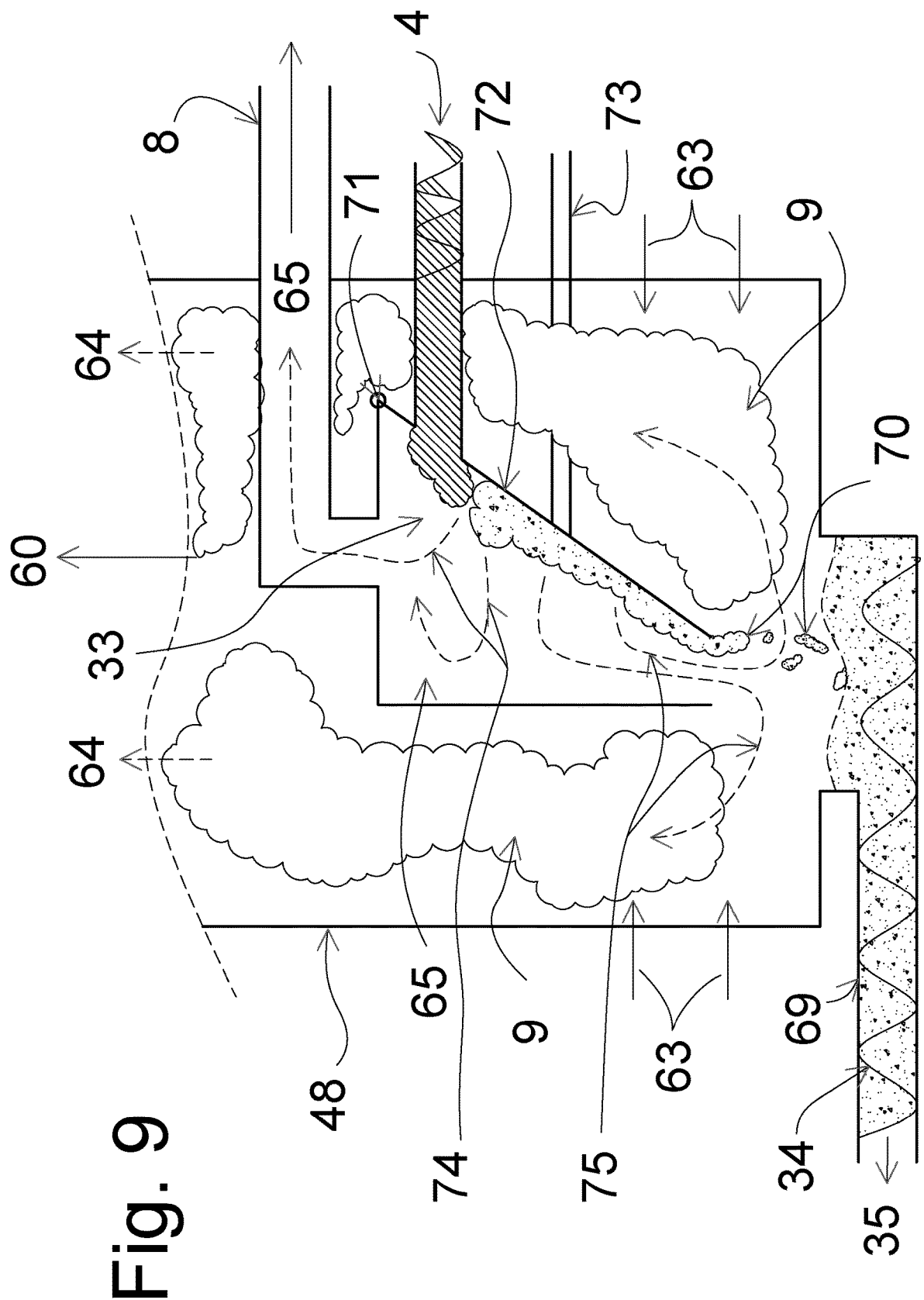
FIG. 9 is a detailed view of an alternate embodiment where the pyrolysis reactor 33 is fitted with an adjustable hot-plate wall 72 and is hinged allowing angle adjustment to made to optimize the collection of fixed carbon and contaminants 70 that collect on hot-plate 72 by rotating hot-plate 72 on hinge 71.

Referring to FIG. 9, there is shown a detailed view of an alternate embodiment where the pyrolysis reactor 33 is fitted with an adjustable hot-plate wall 72 and is hinged allowing angle adjustment to made to optimize the collection of fixed carbon and contaminants 70 that collect on hot-plate 72 by rotating hot-plate 72 on hinge 71. Also, it is expected that a vibratory rod 73 attached to hot-plate 72 may be used to aid in removing the carbon and contaminates 70 from hot-plate 72. Vibratory rod 73 could be any of several commercially available vibrating machines such as those sold by Vibco. (http://www.vibco.com).

Figure 10:
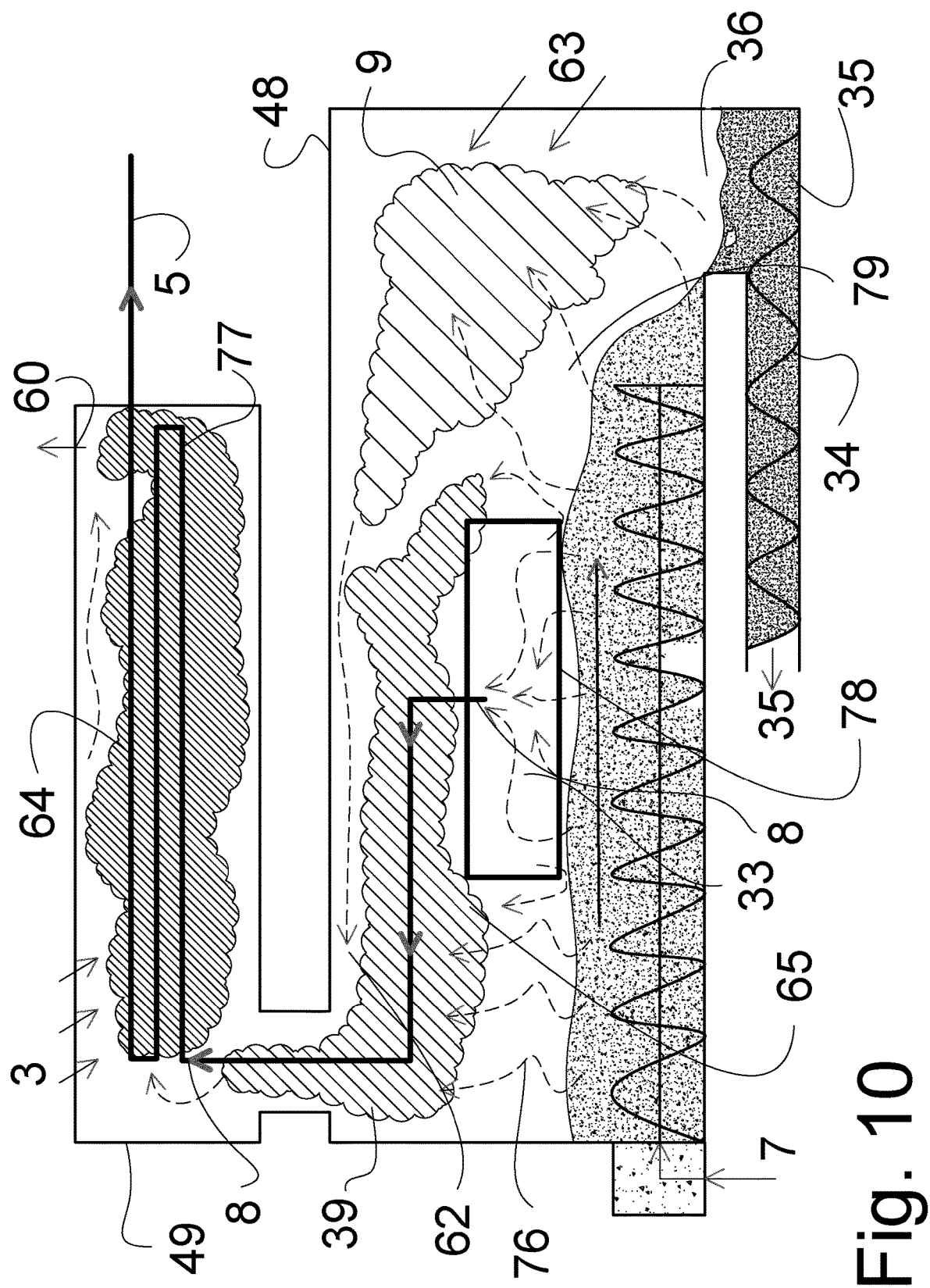
FIG. 10 is a detailed view of a Pyrolysis Reactor employing an alternate method of collecting Rich Syn-Gas via a Pyrolysis Reactor Hood placed inside the primary gasification chamber and Processing a single Blended Fuel Stream (SBF) which is delivered to the primary gasification chamber in an oxygen deprived condition.

Referring to FIG. 10, there is shown a detailed view of the Pyrolysis Reactor employing an alternate method of collecting Rich Syn-Gas via a Pyrolysis Reactor Hood and Processing a single Blended Fuel Stream (SBF). FIG. 10 details an alternate embodiment where a pyrolysis reactor hood 78 is suspended above the counterflow horizontally moving fuel bed where rich synthetic gasses (RG) are collected in pyrolysis reactor hood 78. Blended fuel stream (SBF) enters the process via fuel feeder 7 under oxygen deprived/reduced conditions and is conveyed horizontally through Primary gasification reactor 48 from fuel feeder 7 to ash extraction point 36. SBF moves in a horizontal and counterflow direction to the dilute syn-gasses 39, traveling from fuel feeder 7 to extraction point 36 and is progressively heated by absorbing thermal energy for the high temperature counterflowing dilute syn-gasses 39 which are produced in primary gasification zone 9. As the SBF absorbs the energy from counterflowing hot dilute syn-gas 9, the SBF material increases in temperature causing water and light hydrocarbon compounds/VOC's to be driven off in the drying section of the primary gasifier 76. As the SBF material continues to absorb thermal energy from the counterflowing dilute syn-gasses 39 which are traveling counterflow and above the fuel bed, the SBF begins to phase change/volatize, releasing rich syn-gasses (undiluted gasses not containing products of thermal oxidation such as CO2 or nitrogen present in air used as oxidizing agent in gasification) within Pyrolysis Hood 78. SBF material continues to move counterflow and horizontally from fuel inlet 7 to ash outlet 36 and once past the Pyrolysis Hood 78, enters the final reaction zone 79 where, as the material reaches maximum process temps, the remaining syn-gasses are released into primary reaction zone 9. A controlled amount of air used as an oxidant is injected into primary reaction zone 9 via conduits 63 from fan 10 sustaining an thermal oxidation reaction between the syn-gasses and the oxygen present in the air in order to maintain an Operator temperature setpoint in primary reaction zone 9. The system controls the amount of air delivered into primary reaction area 9 via an onboard PLC to maintain an operator temperature set-point by monitoring temperature information received from various temperature probes placed in the Primary gasification chamber 48, and then actuating commercially available inline valves which control the flow of air coming from Primary Air Fan 10.

Rich Syn-Gasses (RG) collected in Pyrolysis Reactor Hood 78 are drawn through conduit 8 and continue through a thermal cracker/heat exchanger 78 where the RG temperatures may be increased to temperatures in the range of 1500° F. to 2500° F. causing further thermal cracking of the RG into shorter length hydrocarbon chains. The Cracked RG then continues via conduit 5 for further process or for use as a fuel gas or Renewable Natural Gas (RNG) in systems such as electrical generating equipment.

It is understood that the embodiments described and illustrated herein are merely illustrative of embodiments of the present invention. Other embodiments that would occur to those skilled in the art are contemplated within the scope of the present invention. The invention includes variants not described or illustrated herein in detail. Thus, the embodiments described and illustrated herein should not be considered to limit the invention as construed in accordance with the accompanying claims.

What is claimed is:

1. A system for producing synthetic gas from solid fuel comprising waste material, municipal solid waste or biomass, and for upgrading the synthetic gas produced, the system comprising:
    a first thermal chamber having a gasification zone in which an incoming first fuel stream is gasified by thermal oxidation to produce a first synthetic gas stream and heat;
    a first fuel feed system that delivers the first fuel stream into the gasification zone in an oxygen starved manner resulting in an oxygen starved delivery of the first fuel stream into the first thermal chamber;
    a pyrolysis reactor housed within the first thermal chamber;
    a second fuel feed system that delivers a second fuel stream into the pyrolysis reactor in a manner that prevents oxygen from entering the pyrolysis reactor, wherein the heat produced in the gasification zone is imparted to the second fuel stream in the pyrolysis reactor to cause pyrolysis of the second fuel stream and produce a second synthetic gas stream; and
    a thermal catalytic reactor comprising a second thermal chamber and a catalyst chamber defined by a housing located within the second thermal chamber, the catalyst chamber having a selected catalyst therein, the second thermal chamber being operable to receive the first synthetic gas stream and completely thermally oxidize the first synthetic gas stream to produce high temperature flue gas that imparts heat to the housing of the catalyst chamber, and the catalyst chamber being operable to receive the second synthetic gas stream and to thermally crack the second synthetic gas stream to produce a cracked synthetic gas stream, and then to direct the cracked synthetic gas stream to the selected catalyst to yield a finished gas or liquid product having a desired chemical composition as determined by the selected catalyst in the catalyst chamber.

2. The system as claimed in claim 1 wherein the thermal catalytic reactor is separate from the first thermal chamber, and the system further comprises a first gas conduit from the gasification zone to the second thermal chamber and a second gas conduit from the pyrolysis reactor to the catalyst chamber.

3. The system as claimed in claim 2 wherein the second thermal chamber includes a flue gas outlet, and a blower downstream of the flue gas outlet that produces a negative pressure upstream of itself to draw the first synthetic gas stream out of the first thermal chamber, through the first gas conduit, and into the second thermal chamber, and the high temperature flue gas past the thermal catalytic reactor.

4. The system as claimed in claim 3 wherein the first thermal chamber has a fuel inlet end and an ash outlet end, and a conveyor to move the first fuel stream from the fuel inlet end towards the ash outlet end such that a portion of the first synthetic gas stream is produced towards the ash outlet end.

5. The system as claimed in claim 4 wherein the pyrolysis reactor is adjacent the ash outlet end.

6. The system as claimed in claim 5 wherein the first gas conduit exits the first thermal chamber adjacent the fuel inlet end to promote a flow of the first synthetic gas stream that is counter to a direction of the movement of the first fuel stream in the first thermal chamber.

7. The system as claimed in claim 6 further comprising an ash extraction mechanism that removes ash and residue from the first thermal chamber via an ash outlet.

8. The system as claimed in claim 7 further comprising a flue gas conduit to convey the flue gas from the thermal catalytic reactor to a system for utilizing a portion of remaining heat in the flue gas for useful heating applications.

9. The system as claimed in claim 7 further comprising a heating surface in the pyrolysis reactor and wherein the second fuel feed system is operable to convey the second fuel stream onto the heating surface, wherein the heating surface is heated as a result of the thermal oxidation taking place in the gasification zone to a temperature sufficient to commence pyrolysis of the second fuel stream upon contact with the heating surface.

10. The system as claimed in claim 9 wherein the heating surface comprises a plate member sloped downwardly from a fuel receiving end and being in thermal communication with the gasification zone of the first thermal chamber to receive heat produced from the thermal oxidation of the first fuel stream.

11. The system as claimed in claim 10 where in the plate member is hinged at its fuel receiving end such that the plate member may be moved into a vertical orientation for clearing of any built up ash and residue from the heating surface.

12. The system as claimed in claim 11 further comprising an actuator to move the plate member between a sloped orientation and vertical orientation.

13. A system for producing synthetic gas from solid fuel comprising waste material, municipal solid waste or biomass, and for upgrading the synthetic gas produced, the system comprising:
  a first thermal chamber having a gasification zone in which fuel is gasified by thermal oxidation to produce a first synthetic gas stream and heat;
  a pyrolysis reactor housed within the first thermal chamber;
  a fuel feed system that delivers a fuel stream into the pyrolysis reactor and the gasification zone in a manner that prevents oxygen from entering the pyrolysis reactor, wherein the heat produced in the gasification zone is imparted to the fuel stream in the pyrolysis reactor to cause pyrolysis of the fuel stream and produce a second synthetic gas stream; and
  a thermal catalytic reactor comprising a second thermal chamber and a catalyst chamber defined by a housing located within the second thermal chamber, the catalyst chamber having a selected catalyst therein, the second thermal chamber being operable to receive the first synthetic gas stream and completely thermally oxidize the first synthetic gas stream to produce high temperature flue gas that imparts heat to the housing of the catalyst chamber, and the catalyst chamber being operable to receive the second synthetic gas stream and to thermally crack the second synthetic gas stream to produce a cracked synthetic gas stream, and then to direct the cracked synthetic gas stream to the selected catalyst to yield a finished gas or liquid product having a desired chemical composition as determined by the selected catalyst in the catalyst chamber.

14. The system as claimed in claim 13 wherein the thermal catalytic reactor is separate from the first thermal chamber, and the system further comprises a first gas conduit from the gasification zone to the second thermal chamber and a second gas conduit from the pyrolysis reactor to the catalyst chamber.

15. The system as claimed in claim 14 wherein the second thermal chamber includes a flue gas outlet, and a blower downstream of the flue gas outlet that produces a negative pressure upstream of itself to draw the first synthetic gas stream out of the first thermal chamber, through the first gas conduit, and into the second thermal chamber, and the high temperature flue gas past the thermal catalytic reactor.

16. The system as claimed in claim 15 further comprising an ash extraction mechanism that removes ash and residue from the first thermal chamber via an ash outlet.

17. The system as claimed in claim 16 further comprising a heating surface in the pyrolysis reactor and wherein the fuel feed system is operable to convey a portion of the fuel stream onto the heating surface, wherein the heating surface is heated as a result of the thermal oxidation taking place in the gasification zone to a temperature sufficient to commence pyrolysis of the portion of the fuel stream upon contact with the heating surface.

18. The system as claimed in claim 17 wherein the heating surface comprises a plate member sloped downwardly from a fuel receiving end and being in thermal communication with the gasification zone of the first thermal chamber to receive heat produced from the thermal oxidation taking place in the gasification zone.

19. The system as claimed in claim 18 where in the plate member is hinged at its fuel receiving end such that the plate member may be moved into a vertical orientation for clearing of any built up ash and residue from the heating surface.

20. A process for producing synthetic gas from solid fuel comprising waste material, municipal solid waste or biomass, and for upgrading the synthetic gas produced, the process comprising the steps of:
  a. providing a first thermal chamber having a gasification zone and feeding a first fuel stream into the gasification zone;
  b. gasifying the first fuel stream by thermal oxidation in the gasification zone to produce a first synthetic gas stream and heat;
  c. providing a pyrolysis reactor housed within the first thermal chamber;
  d. feeding a second fuel stream into the pyrolysis reactor in a manner that prevents oxygen from entering the pyrolysis reactor, and pyrolyzing the second fuel stream using the heat produced in the gasification zone to produce a second synthetic gas stream; and
  e. providing a thermal catalytic reactor comprising a second thermal chamber and a catalyst chamber defined by a housing located within the second thermal chamber, the catalyst chamber having a selected catalyst therein;
  f. flowing the first synthetic gas stream into the second thermal chamber and completely thermally oxidizing the first synthetic gas stream to produce high temperature flue gas that imparts heat to the housing of the catalyst chamber;
  g. flowing the second synthetic gas stream through the catalyst chamber and thermally cracking the second synthetic gas stream to produce a cracked synthetic gas stream; and
  h. flowing the cracked synthetic gas stream through the selected catalyst to yield a finished gas or liquid product having a desired chemical composition as determined by the selected catalyst in the catalyst chamber.

21. The process as claimed in claim 20 wherein the thermal catalytic reactor is provided separate from the first thermal chamber, and further providing a first gas conduit from the gasification zone to the second thermal chamber, and a second gas conduit from the pyrolysis reactor to the catalyst chamber.

22. The process as claimed in claim 21 wherein the second thermal chamber includes a flue gas outlet, and further comprising a step of producing a negative pressure upstream of the flue gas outlet to draw the first synthetic gas stream out of the first thermal chamber, through the first gas conduit, and into the second thermal chamber, and the high temperature flue gas past the thermal catalytic reactor.

23. The process as claimed in claim 22 wherein the first thermal chamber has a fuel inlet end and an ash outlet end, and further comprising a step of conveying the first fuel stream from the fuel inlet end towards the ash outlet end such that a portion of the first synthetic gas stream is produced towards the ash outlet end.

24. The process as claimed in claim 23 wherein the pyrolysis reactor is provided adjacent the ash outlet end.

25. The process as claimed in claim 24 further comprising a step of flowing the first synthetic gas stream counter to a direction of the movement of the first fuel stream in the first thermal chamber.

26. The process as claimed in claim 25 further comprising a step of removing ash and residue from the first thermal chamber via the ash outlet.

27. The process as claimed in claim 26 further comprising a step utilizing the flue gas exiting from the thermal catalytic reactor for useful heating applications.

28. The process as claimed in claim 26 further comprising a step providing a heating surface in the pyrolysis reactor and conveying the second fuel stream onto the heating surface, wherein the heating surface is heated as a result of the thermal oxidation taking place in the gasification zone to a temperature sufficient to commence pyrolysis of the second fuel stream upon contact with the heating surface.

* * * * *